P. G. ZIMMERMANN & H. KLECKLER.
PUSHER HYDROAEROPLANE.
APPLICATION FILED MAY 4, 1916.

1,296,730.

Patented Mar. 11, 1919
7 SHEETS—SHEET 1.

Inventors
HENRY KLECKLER and
PAUL G. ZIMMERMANN.

By

Attorney

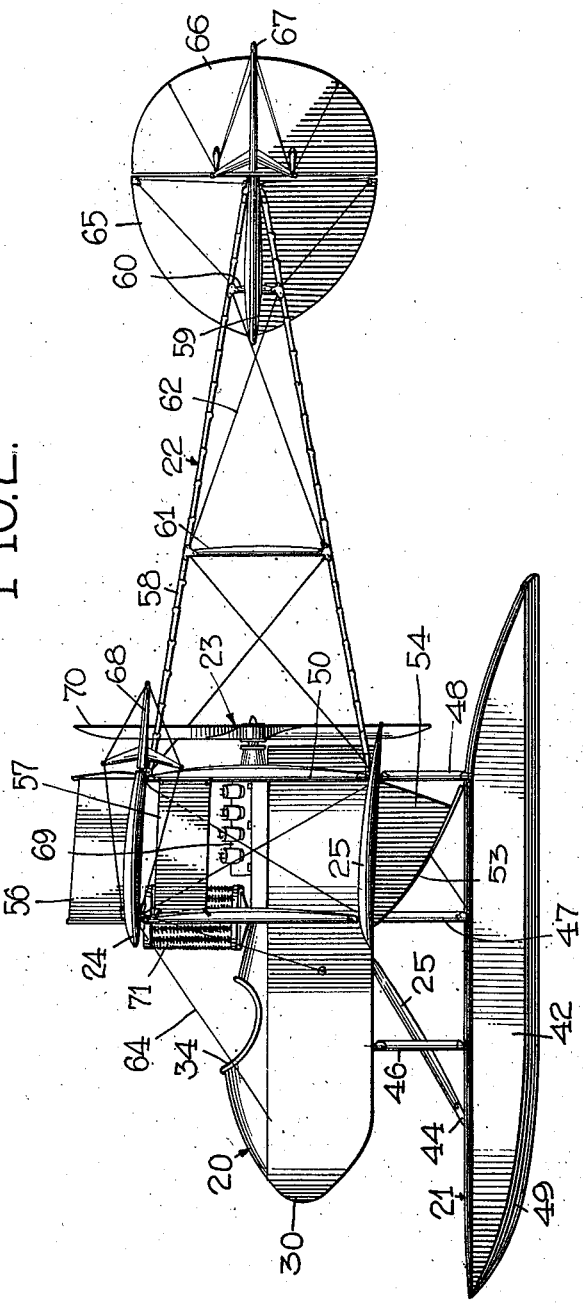

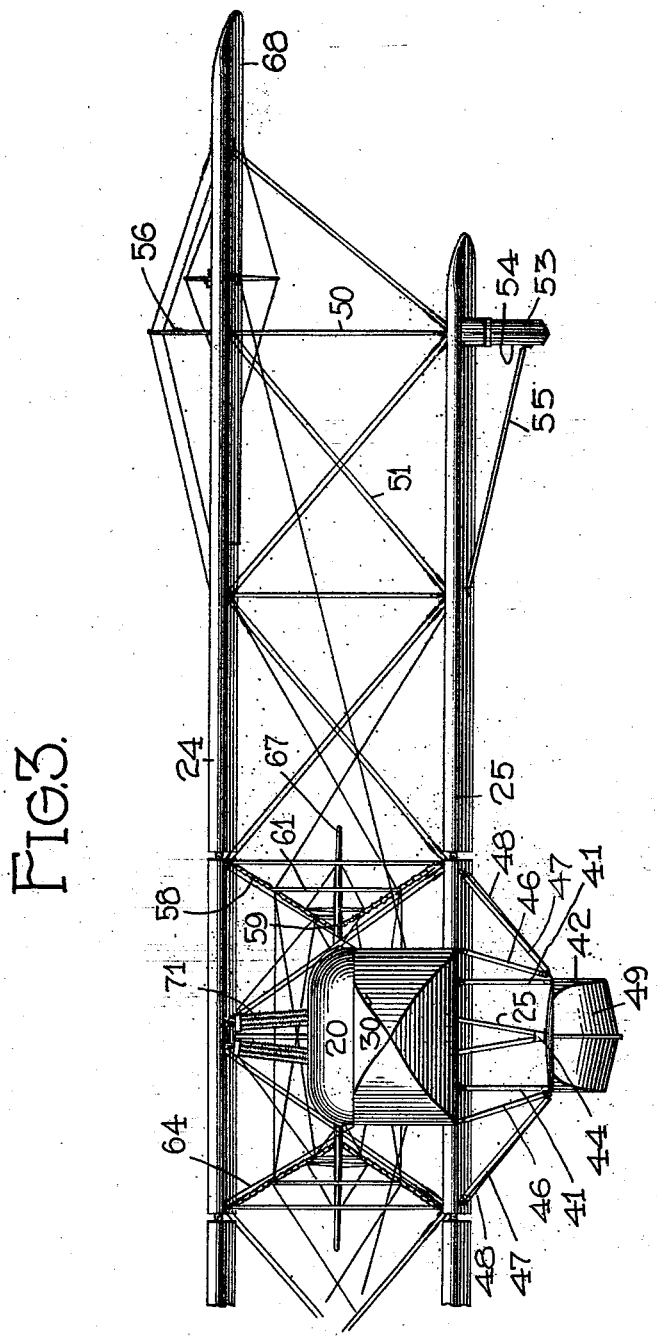

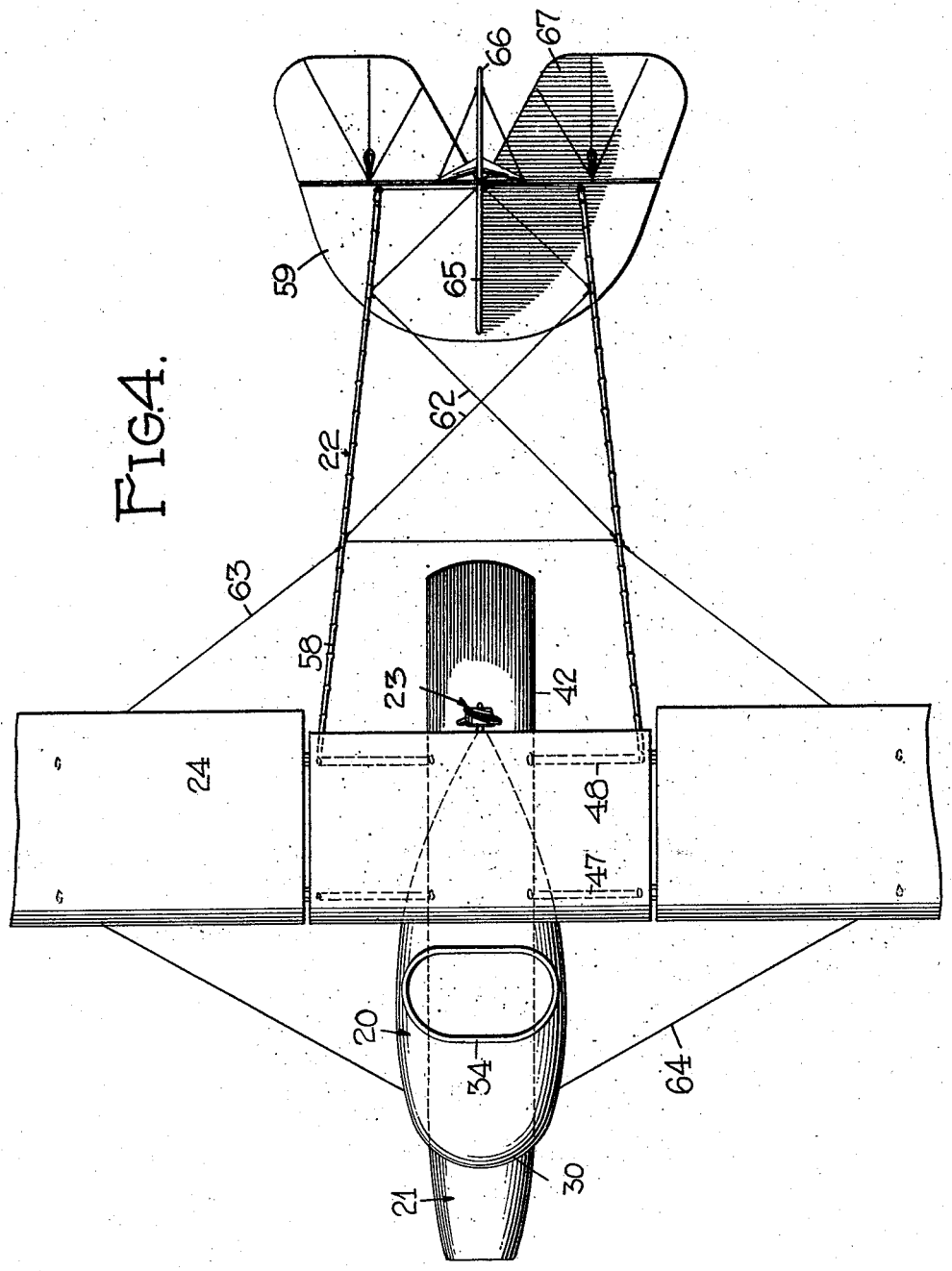

P. G. ZIMMERMANN & H. KLECKLER.
PUSHER HYDROAEROPLANE.
APPLICATION FILED MAY 4, 1916.
1,296,730.
Patented Mar. 11, 1919.
7 SHEETS—SHEET 5.
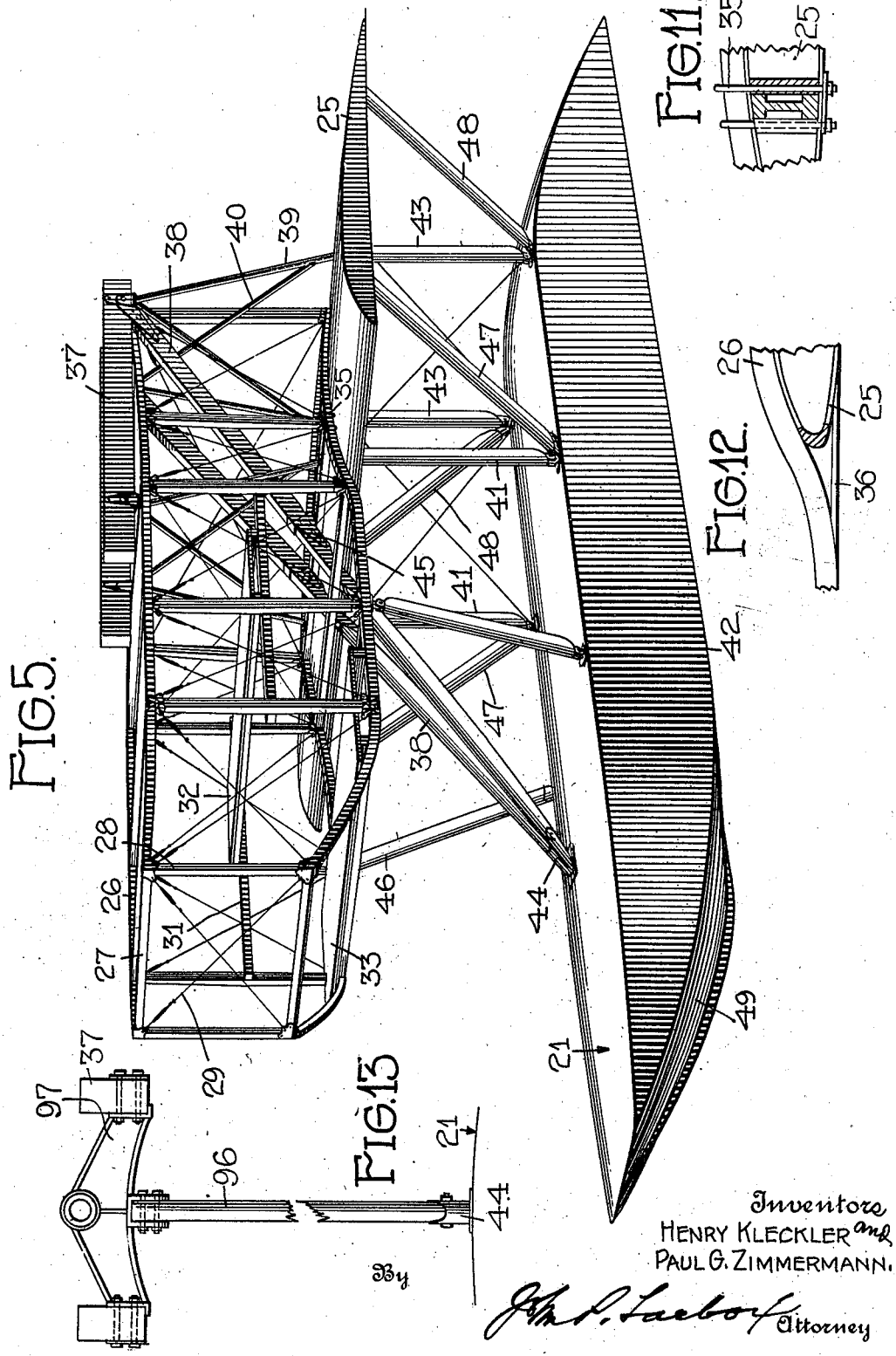
Inventors
HENRY KLECKLER and
PAUL G. ZIMMERMANN.
By
Attorney

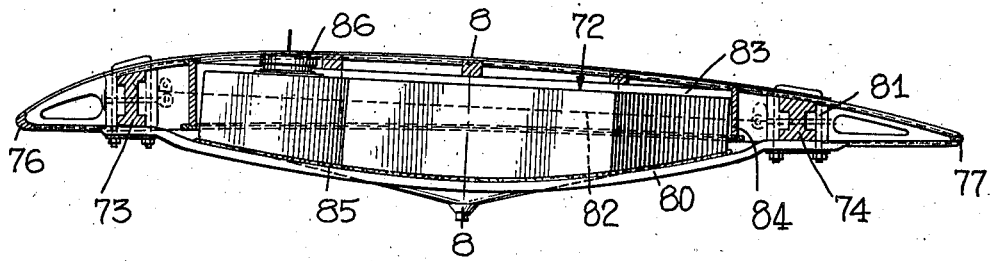
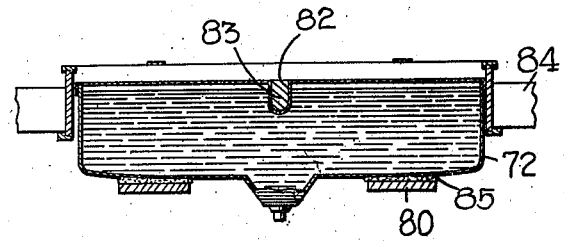
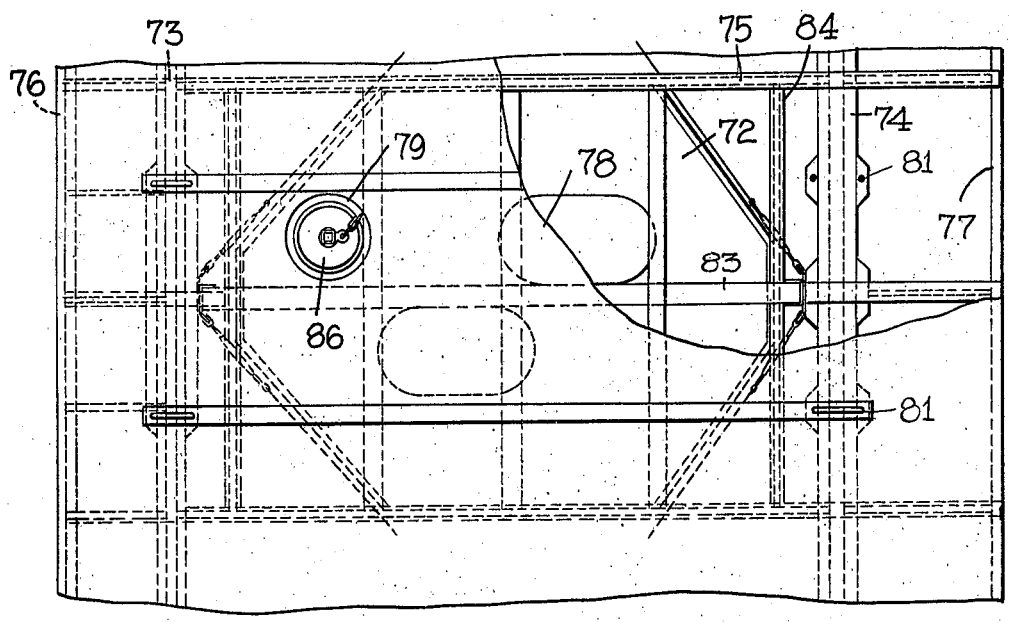

P. G. ZIMMERMANN & H. KLECKLER.
PUSHER HYDROAEROPLANE.
APPLICATION FILED MAY 4, 1916.
1,296,730.
Patented Mar. 11, 1919.
7 SHEETS—SHEET 7.
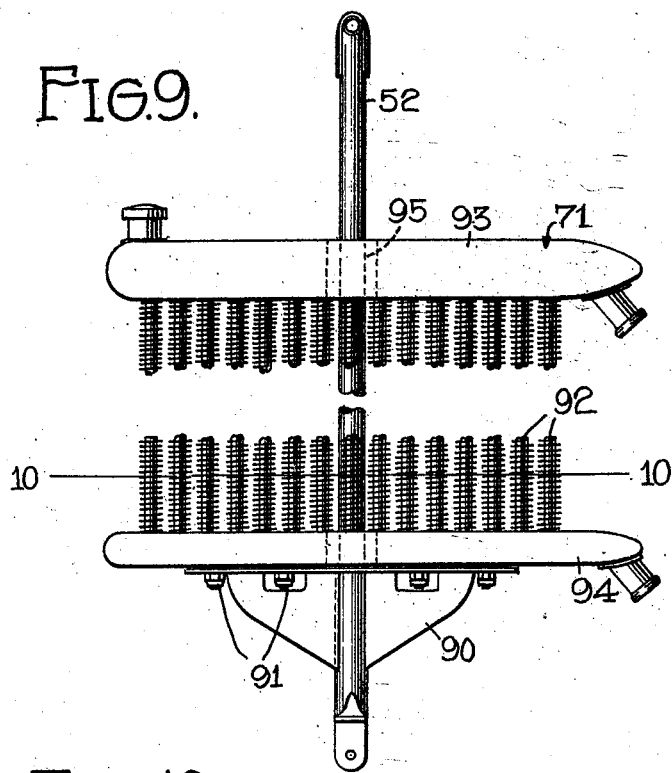
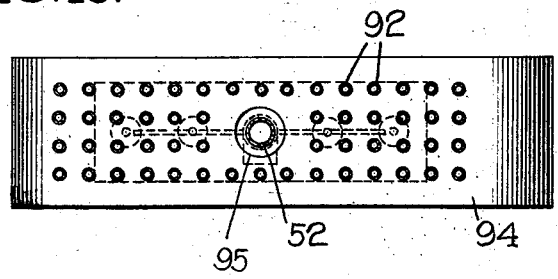
Inventors
HENRY KLECKLER and
PAUL G. ZIMMERMANN.
By John P. Larbox
Attorney

UNITED STATES PATENT OFFICE.

PAUL G. ZIMMERMANN AND HENRY KLECKLER, OF BUFFALO, NEW YORK, ASSIGNORS TO CURTISS AEROPLANE AND MOTOR CORPORATION, A CORPORATION OF NEW YORK.

PUSHER-HYDROAEROPLANE.

1,296,730.     Specification of Letters Patent.     Patented Mar. 11, 1919.

Application filed May 4, 1916. Serial No. 95,495.

*To all whom it may concern:*

Be it known that we, PAUL G. ZIMMERMANN and HENRY KLECKLER, citizens of the United States, residing at Buffalo, in the county of Erie and State of New York, have invented certain new and useful Improvements in Pusher-Hydroaeroplanes, of which the following is a specification.

Our invention relates to aircraft and has particular reference to hydroaeroplanes designed for flights of short duration, quick assembly, and inherent stability during flight.

In view of the unprecedented activity in the aeronautical art and the adoption of aircraft for many and varied uses, it is incumbent upon manufacturers and others interested in the development of the aeroplane to provide a perfectly safe machine which will enable unskilled aviators to learn, by actual flight, the various essentials to complete and perfect control.

A machine constructed with the foregoing in view should, above all else, be designed with care. Each and every element of the machine should be judiciously selected from the best of light materials and in assembly, trussed and tied in a manner conducive to maximum strength. Anti-skid planes, where practical, should be employed and the engine bed diagonally and laterally braced respectively to the landing gear and to the supporting planes, of which, in the present instance, there are two. The tail structure and empennage should be constructed with precision and the machine as a whole properly balanced on its several axes—vertical, longitudinal and horizontal.

The very nature of the machine and the demands made thereon have been carefully considered and the structural elements accordingly arranged. The fuel capacity and useful load are minimized and the exposed parts streamlined and coördinated to offer the least resistance incident to flight. In the embodiment illustrated and which we consider preferred, the machine is of the pusher type with the nacelle disposed almost wholly ahead of the center of pressure and intermediate the superposed planes. The engine bed and the engine mounted thereon are located directly over the lower plane, at the aft end of the nacelle, and in the approximate vertical plane of the center of gravity. Braces, as suggested, lead from the rear end of the engine bed laterally to the lower plane and forwardly and downwardly, through the nacelle, to the landing gear—*i. e.*, a pontoon. Quick assembly of the machine parts, if necessary, is made possible by the novel conformation of the underneath surface of the nacelle, which as hereinafter pointed out, is of a construction designed to complementally engage with the top convex surface of the lower supporting plane without a break in the streamline continuity from the forward end of the nacelle to the aft or trailing edge of the plane. The fuel tank or container feeds directly to the motor by gravity and is built into the upper plane whereby it offers no head resistance. If desired, the lubricant may be similarly contained. This particular feature of the invention is thought to be novel in the extreme. As in most machines of the pusher type, the radiator (forming a part of the propelling power plant) is located wholly without the nacelle to accordingly receive the maximum cooling effect occasioned by the continuous air blast imposed thereon during flight. The type, location and arrangement of the various radiator parts, like other features to be hereinafter more fully described are considered new and accordingly substantiate the claims to follow:

In describing our invention in detail, reference will be had to the accompanying drawings wherein like characters of reference designate like or corresponding parts throughout the several views, of which:

Fig. 2 is a side elevation;

Fig. 3 is a front elevation, partly broken away;

Fig. 4 is a top plan view partly broken away;

Fig. 5 is a detail perspective view of the landing gear, the nacelle frame and the engine section panel of the lower wing or plane illustrating the manner in which the nacelle is mounted to rest thereon;

Fig. 6 is a transverse section of the upper supporting plane illustrating the location and arrangement of the fuel tank therein;

Fig. 7 is a fragmentary top plan view of the upper supporting plane, partly broken away to better illustrate the location and arrangement of the fuel tank;

Fig. 8 is a section on the line 8—8 of Fig. 6;

Fig. 9 is a detail side elevation of one of the radiators illustrating the manner in which the wing struts coöperate to support the radiator thereon;

Fig. 10 is a section on the line 10—10 of Fig. 9;

Fig. 11 is a detail perspective view of one of the fastening devices utilized to fasten the nacelle frame to the lower supporting plane;

Fig. 12 is an enlarged section illustrating the connection between the lower supporting plane and the lower longerons of the nacelle that the means providing for the continuity of the bottom surface of the nacelle may be disclosed, and Fig. 13 is a view illustrating a modified form of engine bed bracing.

Figure 1:
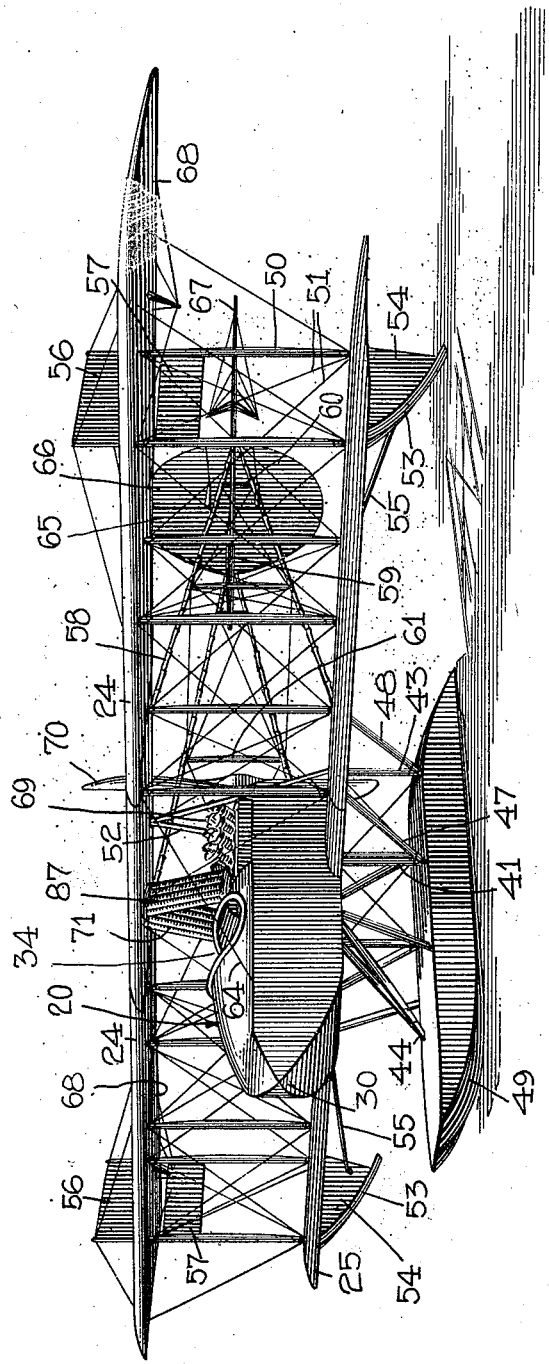
Figure 1 is a perspective view of the complete machine.

In the embodiment of the invention selected for illustration, 20 designates in its entirety the nacelle, 21 in a like manner the landing gear, 22 the tail structure, 23 the propelling power plant, and 24 and 25 respectively, the upper and lower supporting or sustaining planes.

The nacelle 20 may be generally described as comprising the usual longerons 26, cross struts 27, vertical struts 28 and interconnecting diagonal wiring 29. In addition to a frame consisting of the elements just described, the nacelle may be said to further include an outer fabric covering 30 (whereby a streamline form is obtained), seat rails 31, a pilot's seat 32, a foot rest 33, and a cockpit 34, the latter, and in fact the greater portion of the nacelle, being disposed wholly ahead of the center of pressure of the supporting surfaces 24 and 25. The lower longerons 26 are of special form or conformation in that they complementally engage with the top convex surface of the lower supporting plane 25 as illustrated to advantage in Fig. 5. Removable fastening devices 35 of an inverted U-form engage with the lower longerons of the nacelle and in consequence permit of quick assembly of the machine parts since it is an easy matter to bodily remove the nacelle from engagement with the lower wing or plane by simply removing the fastening devices and disconnecting the several braces hereinafter more particularly described.

Although it is impracticable to shape the lower longerons to conform exactly to the top configuration of the lower supporting plane, the streamlined continuity from the forward end of the nacelle to the trailing edge of the plane is maintained, as illustrated in Fig. 12, by interconnecting the lower longerons and the leading edge of the lower supporting plane as indicated at 36.

The aft end of the nacelle 20 is tapered to a point in the approximate vertical plane of the trailing edge of the lower supporting plane, immediately aft of which the propeller (forming a part of the propelling power plant 23) is located. In view of the peculiar rear-end conformation of the nacelle and the fact that the motor should be located in the approximate vertical plane of the center of gravity, the engine bed 37, although built into the nacelle, must extend at its aft end without the nacelle and beyond the longitudinal sides thereof. The manner in which the engine bed is thus extended is best illustrated in Fig. 5. Diagonal forwardly and downwardly diverging braces 38 lead from the extended rear terminals of the bed beams constituting the engine bed, through the nacelle and to the landing gear 21. Such an arrangement will effectually brace the machine fore and aft in alighting. As an additional brace for the engine bed, diagonal braces 39 extend from the aft end thereof laterally to the engine section panel of the lower supporting plane 25. Braces 40, cross arranged, supplement the braces 39.

While we have shown and shall hereinafter describe an aircraft of a construction designed for alighting upon and rising from the surface of a body of water, it is to be understood that we do not contemplate limiting essentially novel structure to hydroaeroplanes, for it is evident that by altering or reconstructing the landing gear and eliminating the wing pontoons (hereinafter referred to), the craft disclosed may be used as a land machine. Forward landing gear or chassis struts 41, located one at each side of the main float or pontoon 42, depend from the under side of the engine section panel 25 of the lower supporting plane in the approximate vertical plane of the forward wing beam of said panel. Parallel rear chassis struts 43 interconnect the pontoon 42 and the lower supporting plane at the aft end of the pontoon and in the approximate vertical plane of the diagonal lateral braces 39 which engage at one end of the engine bed. The diagonally disposed forwardly extending braces 38, as before intimated, converge to a point 44 where they are connected by any suitable means to the pontoon 42 that the forward end of the latter may be braced properly and continuously through the nacelle and to the engine bed. It is directly beneath the point 44 that the greatest impact occurs in alighting upon a body of water. The braces 38, as illustrated in Fig. 5, are divided at a point preferably equidistant from their ends and effectually joined by such means as we have illustrated and designated 45. Such a construction will permit removal of the nacelle bodily from its normal position in engagement with the top surface of the lower supporting plane without necessitating a removal of the upper portions of the diagonal braces 38 from engagement with the engine bed. Angularly disposed struts 46 brace the forwardly extended portion of the nacelle to the pontoon aft of the point 44 and in advance of the leading edge of the said supporting plane. Additional diagonal braces 47 and 48 interconnect the pontoon with the engine section panel of the lower supporting plane as illustrated. The pontoon 42 is streamlined throughout and provided at its forward end with a hydroplaning bottom of a conformation generally considered appropriate for machines of this character.

Coming now to a description of the sustaining planes 24 and 25, it will be observed that the former has a greater spread so as to overhang the latter in a manner common to aeroplanes of the biplane type. Wing posts 50 interconnect the planes or wings and with stay wires 51 truss and brace the wings from end to end. Inverted V-arranged struts or wing posts 52 engage at one end the engine section panel of the upper plane and at their opposite end interiorly of the nacelle, the rear inverted V-arranged struts preferably engaging with the aft terminals of the engine bed beams and the forward terminals of the V-arranged struts with the corresponding terminals thereof. The forward inverted V-arranged struts serve a dual function which will hereinafter be more particularly referred to.

Wing pontoons or floats 53 depend from the outer terminals of the lower plane 25 for an obvious purpose. Each float or pontoon 53 is of a construction affording a hydroplaning surface and at the same time an anti-skid plane since the float proper is web-connected as indicated at 54 to the supporting plane. Each float is diagonally braced as indicated at 55. To further increase inherent lateral stability, anti-skid planes 56 are mounted above the upper supporting plane 25 and adjacent the outer terminals of the plane. These planes 56 together with anti-skid planes 57 disposed intermediate the supporting planes and in the vertical plane of the anti-skid planes 56 laterally stabilize the machine in flight. The planes 57 interconnect the outer wing posts 50 and to a certain extent brace the wings at their outer ends.

The tail structure 22 and the empennage mounted at the aft end of the tail structure are of a well known construction and will therefore be described in general terms. Outriggers 58 lead from the respective supporting planes rearwardly in converging relation, the upper outriggers 58 engaging with the top surface of the horizontal stabilizer 59 and the lower outriggers with the bottom surface thereof. The stabilizer 59 is maintained against movement with respect to the outriggers 58 by means of struts 60 passing therethrough. The tail structure, 70 from end to end is braced by struts and wires designated respectively 61 and 62. Wires 63 brace the tail structure to the wings or supporting planes and wires 64 brace the supporting planes forwardly to the nacelle. Such an arrangement is essential to absolute rigidity and may be best observed by reference to Fig. 4.

The empennage, in addition to the horizontal stabilizer 59 comprises a vertical stabilizer 65, a rudder 66 and a divided or two-part elevator 67. Each of the several elements is of an accepted design, the rudder 66 and elevator 67 being movable respectively on vertical and horizontal axes to direct flight and by any suitable control means (not shown). Ailerons 58 are mounted as usual, at the outer ends of the upper supporting plane to right the machine and accordingly maintain perfect lateral balance.

In addition to the motor 69, the propelling power plant may be described as comprising a propeller 70, of the pusher type, radiators 71 and a fuel tank 72. To decrease the head resistance and increase the useful space in the nacelle, the fuel tank 72 is of a relatively flat construction to provide for its arrangement and securement interiorly of the engine section panel of the upper plane. By disposing the tank as stated and accordingly in the approximate vertical plane of the center of gravity and directly over the motor 69, it is evident that the use of force feed pumps in connection with the motor is unnecessary since the fuel will feed to the motor by gravity. The tank 72 is not only relatively flat but of an appropriate shape to engage between the wing beams 73 and 74 which support the upper wing. The wings, as usual, include not only the wing beams 73 and 74, but transverse compression struts 75, a nose strip 76, a trailing edge strip 77 and a fabric covering 78, the latter, in the embodiment here shown having several openings formed therein, one of the openings 79 permitting access to the tank for filling purposes and the other (not shown) affording ample space for the securement of the feed pipe (likewise not shown) leading from the tank 72 to the motor. Straps 80 interconnect the beams 73 and 74 and engage with the underneath surface of the tank 72 that the said tank may be properly supported. Inverted U-bolts 81 are arranged over the respective beams and pass through the terminals of the respective straps 80 to provide an appropriate fastening means therefor. As a means precluding lateral and longitudinal displacement of the tank with respect to the supporting plane, a transverse groove 82 formed in the tank to receive therein a complemental strut 83 mounted to engage at one end the forward wing beam 73 and at its opposite end, the rear wing beam 74. The struts 75 also engage with the sides of the tank as illustrated in Fig. 7 to preclude longitudinal displacement of the tank. Cross bars 84, connecting adjacent struts 75, engage with the fore and aft terminals of the tank to preclude displacement transversely of the plane. If desired, a strip of felt or other material may be interposed between the underneath surface of the tank and the supporting straps 80 hereinbefore described. Access may be gained to the tank 72 by removing a filler plug 86.

While the major portion of the fuel tank is inclosed within the confines of the upper wing it will be noted upon reference to Fig. 6 that the sump of the tank is extended beneath and therefore without its confines. This arrangement is not only preferred but is extremely desirable for the reason that a positive feed is assured under all flight conditions. Were the sump inclosed within the confines of the wing more or less of the fuel contained in the tank would be trapped should the machine fall back or nose over at a steep angle. The shape of the sump is such that a minimum of resistance is offered.

Where the nacelle structure 20 is streamlined throughout and the motor 69 mounted at the aft end of the nacelle, it is customary to locate the radiator or radiators without the nacelle to secure the desired maximum cooling effect. This practice is followed out in the present case and the radiators of which there are two, designated 71, located intermediate the upper supporting plane and the nacelle, the forward V-arranged strut 52 affording a support therefor. A chair or shelf 90 is made secure to each extension of the forward V-arranged struts to engage with the underneath side of the radiator to which it is secured as indicated at 91. In its preferred embodiment, the radiator may be described as comprising a plurality of parallel tubes 92 through which the water is circulated, an upper streamlined header 93 and a lower similarly formed header 94. Openings 95 are formed in the radiator, one opening in each header, to provide for the passage of the strut extensions therethrough. This arrangement will to a certain extent decrease the head resistance since it is ordinarily customary to have both the struts and the radiator exposed, each offering its proportionate resistance to flight. The radiators 89 may be thus described as embracing the extensions of the strut 52 to which they are fastened by the chairs 90 above described.

Although we have described more or less precise formations and details of construction, we do not intend to be understood as limiting ourselves thereto as we contemplate changes in form, the proportion of parts and the substitution of equivalents as circumstances may suggest or render expedient and without departing from the spirit of the invention as claimed.

If desired, the diagonal braces 38 may be dispensed with and the center of gravity brought just a little nearer the forward end of the machine by running a brace 96, as illustrated in Fig. 13, from the point 44 to the engine plate 97 mounted at the forward end of the engine bed 37. Or, if desired, the structure may be further modified by the provision of a V-brace—the diverged terminals of the brace engaging with the engine bed beams at the opposite end thereof from that illustrated in Fig. 5.

What is claimed is:

1. In an aircraft, superposed supporting planes, and a body structure mounted to rest directly upon the top surface of the lower plane for releasable fastening engagement therewith.

2. In an aircraft, a supporting plane, and a nacelle of a conformation designed to rest upon the top surface of said supporting plane and to extend forwardly therebeyond in the approximate horizontal plane of the underneath surface of said supporting plane to preclude the formation of vortices at the underneath side of the nacelle.

3. In an aircraft, a nacelle structure, and a supporting plane mounted to engage with the underneath aft end of the nacelle without a break in the streamline continuity thereof.

4. In an aircraft, a supporting plane, a body structure mounted to rest upon the top surface of said plane, an engine bed mounted at the aft end of the body structure directly over the supporting plane, a landing base, and a means diagonally bracing the engine bed from its aft end to said base, said means for a portion of its length being inclosed within said body.

5. In an aircraft, a nacelle, an engine bed mounted upon and at the aft end of the nacelle to extend laterally beyond the rear longitudinal sides thereof, and a means bracing that portion of the engine bed thus extended.

6. In an aircraft, a supporting plane, a nacelle, an engine bed mounted upon and at the aft end of the nacelle to extend laterally beyond the longitudinal sides thereof, and a means bracing the extended portion of the engine bed to said supporting plane.

7. In an aircraft, a streamlined nacelle, an engine bed mounted upon and at the aft end of the nacelle to extend laterally beyond the longitudinal sides thereof, a landing base, and a means diagonally and forwardly bracing the extended terminal of the engine bed to said base.

8. In an aircraft, a supporting plane, a removable nacelle body mounted to rest upon the top surface of said supporting plane, a landing gear, an engine bed mounted at the aft end of the nacelle, and a means diagonally and continuously bracing the engine bed to the landing gear through the nacelle.

9. In an aircraft, a supporting plane including wing beams, a body structure mounted to rest upon the top surface of said supporting plane and to extend forwardly therebeyond, a fastening means for the body structure directly engaging with said beams, a landing gear, and a means bracing the extended forward terminal of the body structure to the landing gear.

10. The combination with the supporting wing of an airplane, of a tank having a greater portion of its area inclosed within the confines of the airplane wing and having a portion constituting a sump extending beneath the underneath surface of the wing.

11. In an aircraft, the combination with the propelling power plant, of supporting surfaces mounted one above and the other below the propelling power plant, a fuel tank mounted in the upper supporting surface, a fuel feed-line connection between the fuel tank and power plant, and a sump formed in the fuel tank to extend beneath the underneath surface of the supporting surface within which the tank is inclosed.

12. In an airplane, the combination with an airplane wing comprising wing beams and transverse ribs, of a tank inclosed for the major part within the confines of the wing, the size of the tank being such that its edges abut adjacent ribs, straps arranged beneath the tank to support it, the ends of the straps being fastened to the respective wing beams, and an element extending across the top of the tank to prevent its vertical displacement.

13. In an airplane, the combination with an airplane wing comprising wing beams and internal diagonal wiring, of a tank inclosed for the major part within the confines of the wing, the size of the tank being such that its edges abut adjacent wires, and straps arranged above and below the tank to prevent its vertical displacement, the ends of the straps being fastened to the respective beams of the wing.

14. In an airplane, the combination with an airplane wing comprising wing beams, transverse ribs and internal diagonal wiring, of a tank inclosed for the major part within the confines of the wing, the size and shape of the tank being such that its edges abut adjacent ribs and the diagonal wires to prevent its lateral displacement, and straps arranged above and below the tank to prevent its vertical displacement, the ends of the straps being fastened to the respective beams of the wing.

15. In an aircraft, a propelling power plant, a radiator for the propelling power plant, a structural element of the aircraft mounted to penetrate the body of the radiator and a chair mounted on said element to engage with the radiator to form with said element the radiator support.

16. In an aircraft, a body structure, superposed planes mounted one above and the other below said body structure, converging struts centrally supporting the upper plane, a propelling power plant, and radiators for said power plant arranged to inclose one or more of said struts.

17. In an aircraft, superposed planes, a body structure, inverted V-arranged struts interconnecting the planes via the body structure, and a radiator located without the body structure and upon the inverted V-arranged struts.

18. In an airplane, the combination with airplane wings comprising wing beams, transverse ribs and internal diagonal wiring, of a substantial hexagonal tank inclosed for the major part within the confines of the wing, the shape of the tank being such that interference with the beams, ribs and wires is avoided, and fastening means for the tank directly attached to the wing beam and extended respectively above and beneath the tank for supporting it.

19. In an airplane, the combination with an airplane wing comprising wing beams, of a tank having the greater portion of its area inclosed within the confines of the wing and having a portion constituting a sump extending beneath the wing together with fastening means for the tank connecting with the wing beams whereby the weight of the tank is supported by the beams and the tank held against displacement in all directions.

In testimony whereof we affix our signatures.

PAUL G. ZIMMERMANN.
HENRY KLECKLER.